(12) United States Patent
Lagnado et al.

(10) Patent No.: US 10,901,679 B2
(45) Date of Patent: Jan. 26, 2021

(54) MIRRORING OF SCREENS

(71) Applicant: HEWLETT-PACKARD DEVELOPMENT COMPANY, L.P., Houston, TX (US)

(72) Inventors: Isaac Lagnado, Houston, TX (US); Yi-Kang Hsieh, Taipei (CN); Chung-Chun Chen, Taipei (CN); Han-Kuang Chang, Taipei (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 253 days.

(21) Appl. No.: 16/081,986

(22) PCT Filed: Feb. 6, 2017

(86) PCT No.: PCT/US2017/016654
§ 371 (c)(1),
(2) Date: Sep. 4, 2018

(87) PCT Pub. No.: WO2018/144027
PCT Pub. Date: Aug. 9, 2018

(65) Prior Publication Data
US 2020/0285438 A1   Sep. 10, 2020

(51) Int. Cl.
*G06F 3/14*   (2006.01)
*G09G 3/34*   (2006.01)
*G06F 1/3218*   (2019.01)

(52) U.S. Cl.
CPC ......... *G06F 3/1454* (2013.01); *G09G 3/3406* (2013.01); *G06F 1/3218* (2013.01); *G09G 2330/022* (2013.01); *G09G 2354/00* (2013.01)

(58) Field of Classification Search
CPC .... G06F 3/1454; G06F 3/1423; G06F 1/3218; G06F 1/32; G06F 1/3234; G06F 1/3265; H04N 7/181; G09G 3/3406
See application file for complete search history.

(56) References Cited

U.S. PATENT DOCUMENTS 8,819,268 B1 * 8/2014 Sauer ...................... H04L 67/36
  709/232
8,843,178 B1   9/2014 Wong
(Continued)

FOREIGN PATENT DOCUMENTS

CN   102396291 A   3/2012
CN   103530032 A   1/2014
(Continued)

OTHER PUBLICATIONS

Zhang et al., "Energy Efficient WiFi Display", Retrieved from Internet: http://xyzhang.ucsd.edu/papers/CZhang_MobiSys15_Miracast.pdf, May 18-22, 2015, 14 pages.

*Primary Examiner* — Xuemei Zheng
(74) *Attorney, Agent, or Firm* — HPI Patent Department

(57) ABSTRACT

Examples of mirroring a screen between two devices include establishing a communication link by a sink device with a source device to mirror a screen of the source device on the sink device. Upon determining a same orientation of the source device for a specific time period, a display OFF command is sent to the source device. The display OFF command is indicative of turning OFF a backlight of the screen of the source device. Further, an event notification may be received by the sink device upon occurrence of an event at the source device. The event includes an incoming communication or a change in the orientation of the source device. In addition, in response to the event notification, a switch command is sent to the source device to pause the signal stream and to turn ON the backlight of the screen of the source device.

14 Claims, 10 Drawing Sheets

(56) References Cited

U.S. PATENT DOCUMENTS

| | | |
|---|---|---|
| 8,914,462 B2 | 12/2014 | Chang et al. |
| 9,119,156 B2 | 8/2015 | Green et al. |
| 2007/0046618 A1 | 3/2007 | Imai |
| 2010/0261506 A1 | 10/2010 | Rajamani et al. |
| 2013/0219072 A1 | 8/2013 | Han et al. |
| 2014/0204873 A1 | 7/2014 | Junqua et al. |
| 2015/0019694 A1 | 1/2015 | Feng et al. |
| 2015/0061970 A1* | 3/2015 | Kim ............... G06F 3/1423 345/2.3 |
| 2015/0082058 A1 | 3/2015 | Hahm et al. |
| 2015/0082241 A1 | 3/2015 | Kang et al. |
| 2015/0195601 A1 | 7/2015 | Hahm |
| 2016/0124701 A1 | 5/2016 | Wang et al. |
| 2016/0253142 A1 | 9/2016 | Choi et al. |
| 2017/0285788 A1* | 10/2017 | Park ............... G06F 3/1454 |

FOREIGN PATENT DOCUMENTS

| | | |
|---|---|---|
| CN | 104126310 A | 10/2014 |
| TW | 201419039 A | 5/2014 |
| TW | M536380 | 2/2017 |

\* cited by examiner

MIRRORING OF SCREENS

BACKGROUND

Electronic devices, such as smartphones and personal computers, may be connected with each other for the purpose of mirroring of screens. Mirroring a screen of a first device on to a second device renders contents displayed on the screen of the first device on to a screen of the second device.

BRIEF DESCRIPTION OF DRAWINGS

The following detailed description references the drawings, wherein.

DETAILED DESCRIPTION

Figure 1:
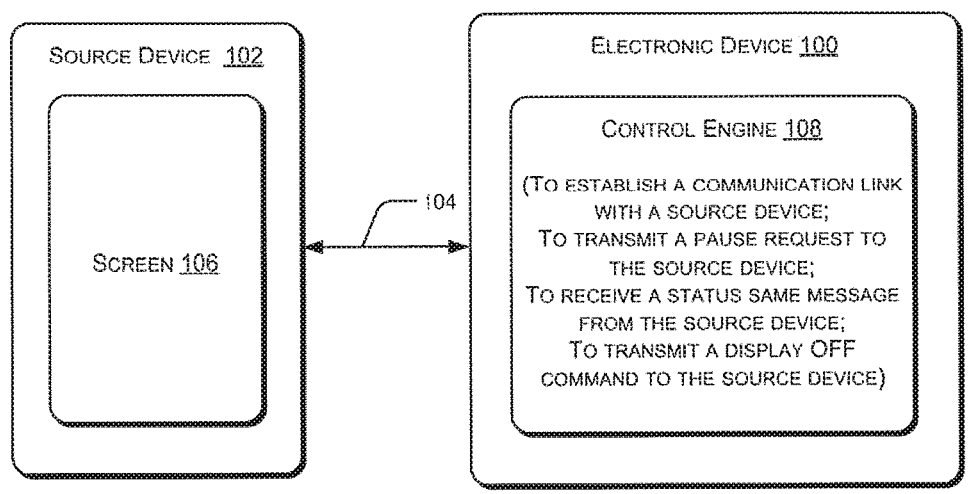
FIG. 1 illustrates a block diagram of an electronic device coupled to a source device for screen mirroring, according to an example.

Mirroring a screen of a device on to another device involves streaming signals, associated with contents displayed on the screen, to the other device. The device whose screen is mirrored may be referred to as a source device, and the device on to which the screen is mirrored may be referred to as a sink device. During a screen mirroring session, any change to the contents displayed on the screen of the source device is also mirrored on a screen of the sink device.

When the screen of the source device is being mirrored on the sink device, a backlight of the screen of the source device is lit. As the source device has to continuously transmit content to the sink device, the continuous usage of the backlight of the screen of the source device may rapidly drain a power supply, such as a battery of the source device. As a result, a user may have to continuously or frequently charge the power supply of the source device, if the screen is to be mirrored for a long time. Moreover, in order to access some other content on the sink device, a user of the sink device may suppress or minimize a screen displaying mirrored content. As the source device is still transmitting content to the sink device, the battery of the source device gets consumed though the user does not view the mirrored content.

Further, during the screen mirroring session, any communication, such as an e-mail, a text message, or a voice call, that may be received at the source device, gets projected on the screen of the sink device. Also, there may be scenarios where such communication may include content that may not be intended for being shared with others and thus may compromise the privacy of the user. To prevent the content from being displayed on the screen of the sink device, the user has to manually interrupt the screen mirroring session.

In addition, due to various circumstances, a communication link between the sink device and the source device may get disrupted. Generally, to connect/disconnect the communication link, the user may have to manually initiate the connection/disconnection on the source device and the sink device. However, there may be instances where the user may not be readily available to provide an input when the screen mirroring session has to be disconnected or re-connected. This may cause inconvenience to the user.

Examples described herein relate to approaches for mirroring screens of source devices on sink devices. The approaches are based on dynamically managing backlight settings of a screen of a source device and managing streaming of screen mirroring signals from the source device while the screen of the source device is being mirrored on a sink device. The approaches facilitate in reducing power consumption in the source device during screen mirroring. In addition, the approaches facilitate in maintaining privacy of a user when any communication is received on the source device during the screen mirroring.

According to an example, a communication link may be established by the sink device with the source device for mirroring a screen of the source device on the sink device. Once the communication link is established, the sink device may ascertain whether a screen displaying mirrored content is minimized for a specific time period. Based on the ascertainment, the sink device may transmit a pause request to the source device to pause the signal stream. While the signal stream is paused, the sink device may receive a status same message indicating same orientation of the source device for a specific time period. In response to the status same message, the sink device may send a display OFF command to the source device to turn OFF a backlight of the screen of the source device.

In an example, upon establishing the communication link, the sink device may receive a status same message indicating same orientation of the source device for the specific time period, during the screen mirroring. Based on the determining, the sink device may send a display OFF command to the source device to turn OFF a backlight of the screen of the source device.

In an example, while the backlight of the screen of the source device is turned OFF, the sink device may receive an event notification from the source device, indicating occurrence of an event. The event may include an incoming communication or a change in the orientation of the source device. In response to the event notification, the sink device may change a display state of a screen displaying the mirrored content on the sink device from a normal state to a minimized state. Further, the sink device may send a switch command to the source device to pause the signal stream and turn ON the backlight of the screen of the source device.

In an example, while the backlight of the screen of the source device is turned OFF, the sink device may determine whether the screen displaying the mirrored content is minimized for the specific time period. Based on the determining, the sink device may transmit a pause request to the source device to pause the signal stream.

In an example, the sink device may also determine a turnover movement of the source device. The turnover movement may indicate a flip movement of the source device. Based on the determining, the sink device may send a disconnect request to the source device to disconnect the communication link between the source device and the sink device. In response to the disconnect request, the sink device may receive a disconnect response from the source device. The disconnect response indicates disconnection of the communication link.

Accordingly, the examples described herein facilitate in reducing power consumption in the source device by turning OFF the backlight of the screen of the source device. Further, pausing of the signal stream upon detection of the incoming communication or change in the orientation of the source device facilitates in maintaining the privacy of the user. In addition, connection or disconnection of the communication link between the source device and the sink device may be performed without user input. Further, based on the display state of the screen displaying the mirrored content, signal stream between the source device and the sink device may be controlled.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

Figure 6:
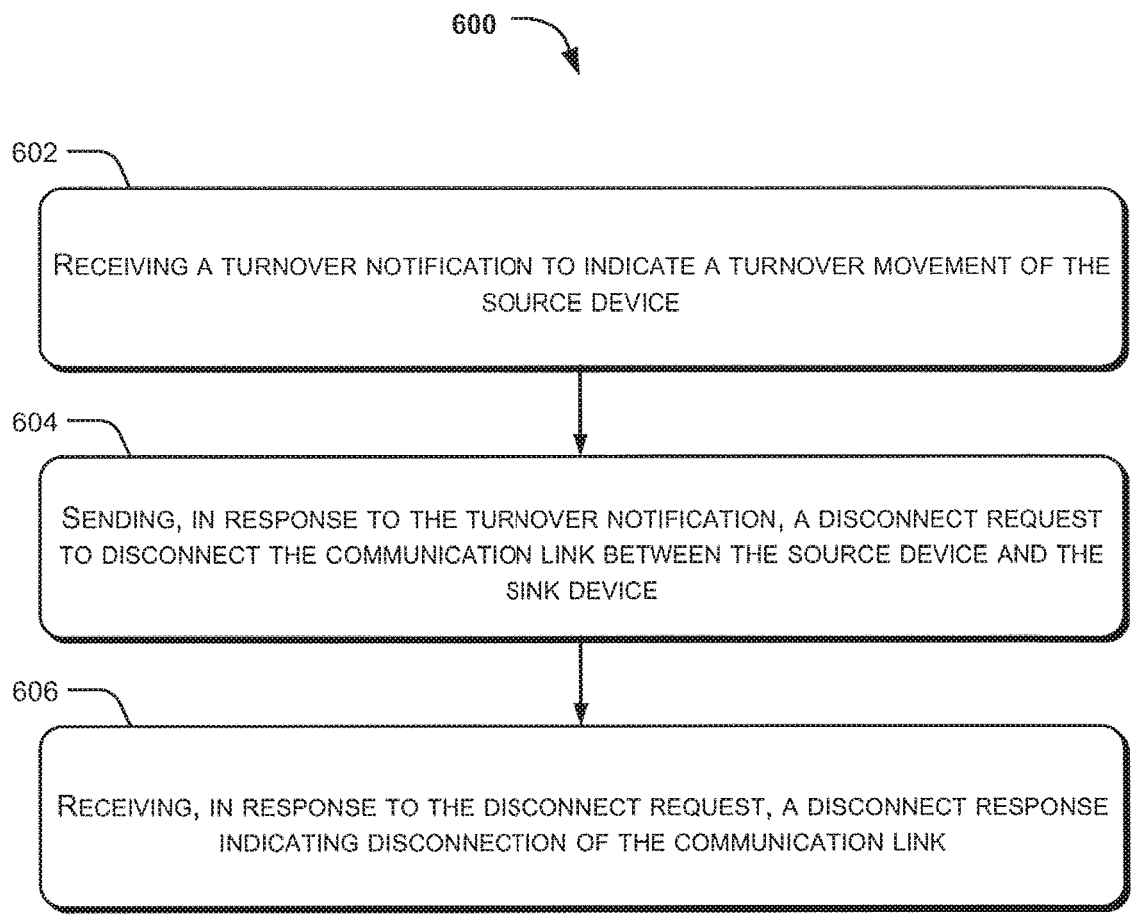
FIG. 6 illustrates a method of mirroring a screen, according to an example.
Figure 7:
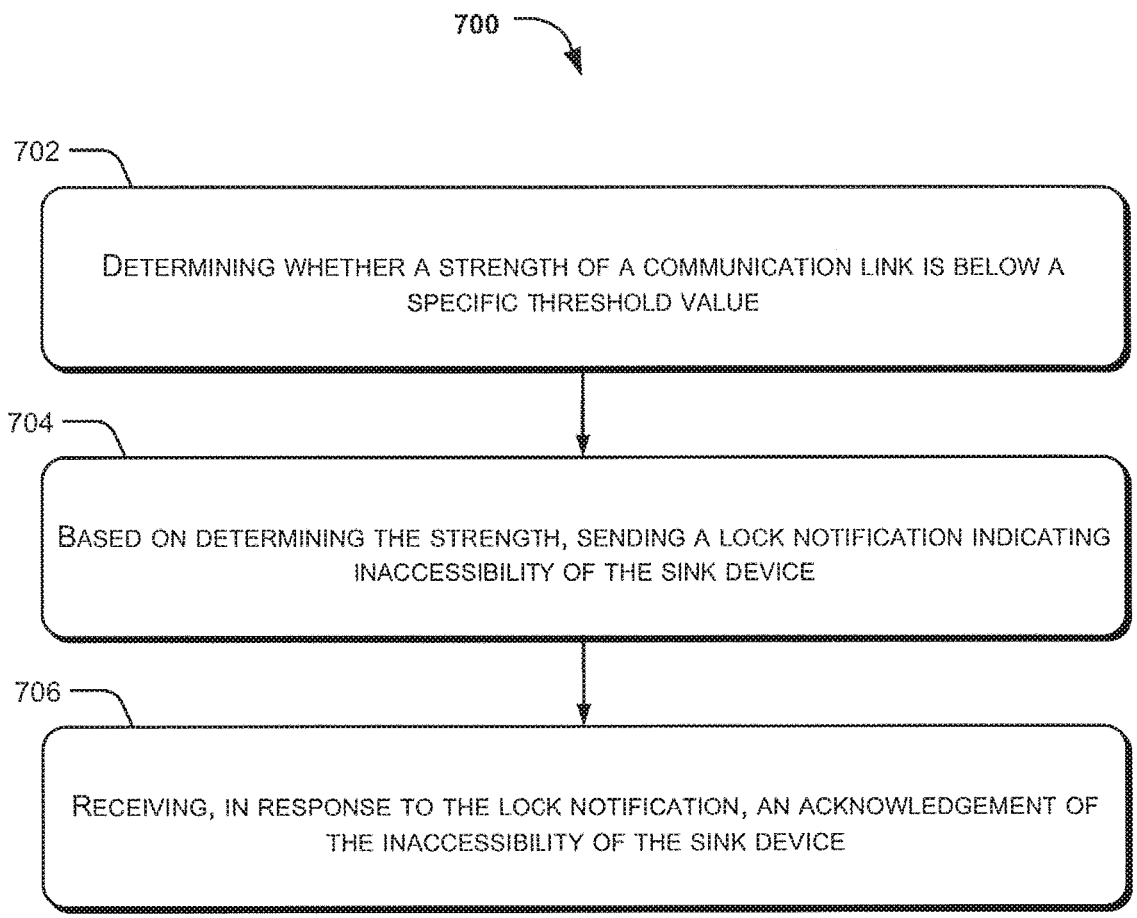
FIG. 7 illustrates a method of mirroring a screen, according to an example.
Figure 8:
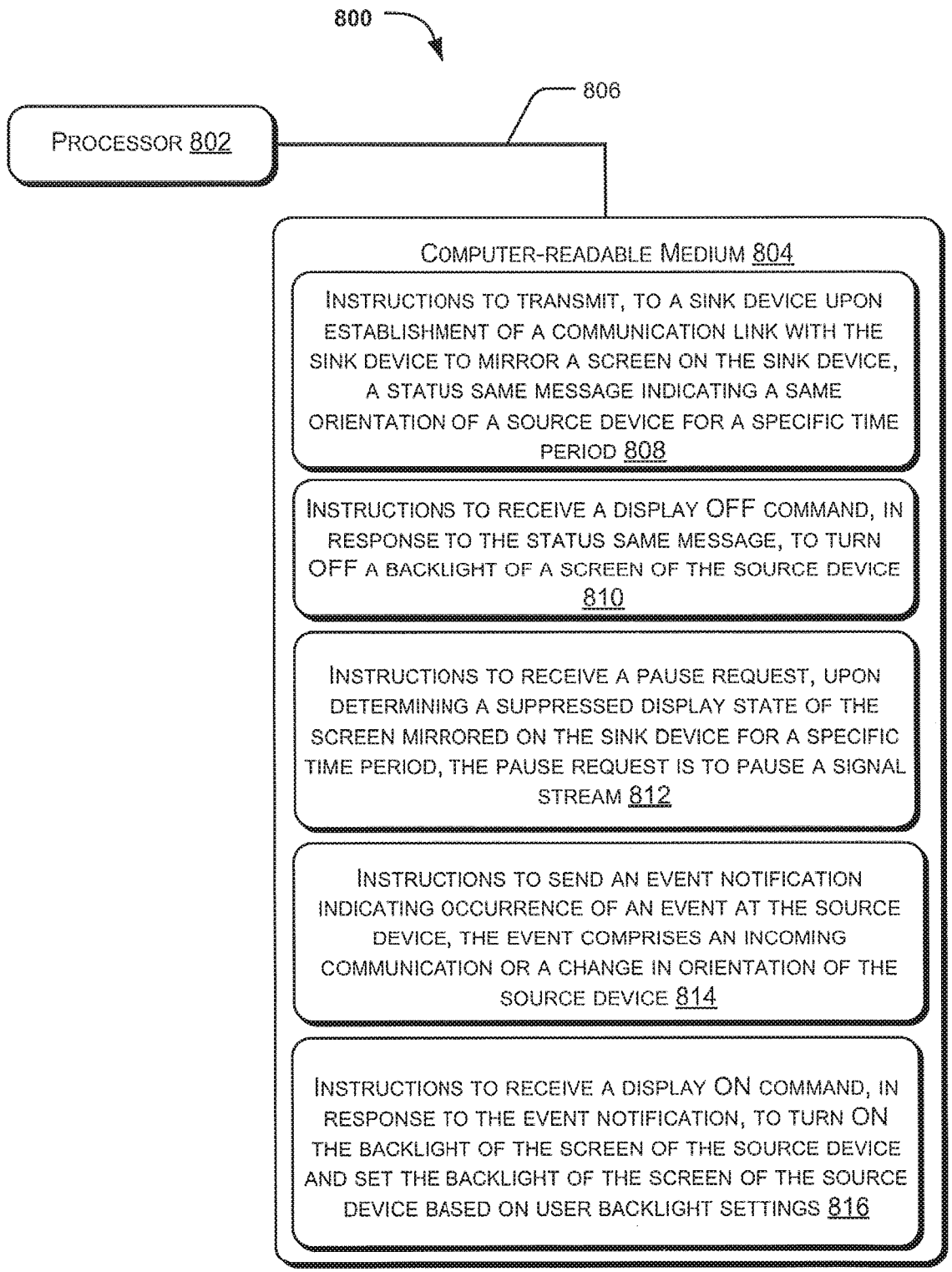
FIG. 8 illustrates a system environment implementing a non-transitory computer readable medium for mirroring a screen, according to an example.

The manner in which the systems and the methods for mirroring a screen are implemented are explained in detail with respect to FIG. 1, FIG. 2, FIG. 3A, FIG. 3B, FIG. 3C, FIG. 4, FIG. 5, FIG. 6, FIG. 7; and FIG. 8. While aspects of described systems and methods for mirroring a screen can be implemented in any number of different computing systems, environments, and/or implementations, the examples are described in the context of the following system(s).

FIG. 1 illustrates a block diagram of an electronic device 100 coupled to a source device 102 for screen mirroring, according to an example. Screen mirroring involves transmitting contents displayed on a screen of the source device 102 to the electronic device 100, In an example, devices 100 and 102, such as smartphones and personal computers, may be connected with each other for the purpose of screen mirroring. In an example, screen mirroring may be employed to output a game or a video that is displayed on a small-screen electronic device, such as the source device 102, to a bigger-screen electronic device, such as the electronic device 100. The electronic device 100 may also be referred to as a sink device. The electronic device 100 may be coupled to the source device 102 through a communication link 104 to receive a screen mirroring stream associated with a screen 106, displaying contents to be mirrored, of the source device 102. The communication link 104 may be a wireless or a wired communication link.

The electronic device 100, based on the screen mirroring stream received from the source device 102, may display contents on a screen (not shown) of the electronic device 100 that mirror the contents on the screen 106 of the source device 102. In an example, the electronic device 100 and the source device 102 may include laptops, smartphones, tablets, notebook computers, and the like.

Further, the electronic device 100 may include a control engine 108. The control engine 108, amongst other things, include routines, programs, objects, components, and data structures, which perform particular tasks or implement particular abstract data types. The control engine 108 may also be implemented as, signal processor(s), state machine(s), logic circuitries, and/or any other device or component that manipulates signals based on operational instructions. Further, the control engine 108 can be implemented by hardware, by computer-readable instructions executed by a processing unit, or by a combination thereof.

In an example, the control engine 108 may establish a communication link, such as the communication link 104, with the source device 102 for mirroring the screen 106 of the source device 102 on the electronic device 100. The control engine 108 may establish the communication link 104 based on a communication request received from the source device 102. The control engine 108 may transmit an acknowledgement message to the source device 102 to confirm that the communication link 104 is established for mirroring the screen 106.

In an example, once the communication link 104 is established, the control engine 108 may determine a display state of a screen displaying the mirrored content on the electronic device 100. If the screen displaying the mirrored content is minimized for a specific time period, for example, 10 seconds, the control engine 108 may transmit a pause request to the source device 102 to pause a signal stream from the source device 102.

In an example, the screen may be voluntarily minimized by a user of the electronic device 100 when the user may wish to access other content on the electronic device 100. In another example, the screen may be automatically minimized when a communication is received at the source device 102, during the screen mirroring session. For instance, during the screen mirroring session, if an audio call is received at the source device 102, the screen displaying the mirrored content may be automatically minimized. In response to the pause request, the source device 102 may transmit a pause response indicating pausing the signal stream to the electronic device 100.

As the backlight of the screen 106 is lit and the signal stream is paused between the devices 100 and 102, the control engine 108 may receive a status same message from the source device 102. The status same message may be transmitted by the source device 102 to indicate a stationary position of the source device 102. For example, the status same message may indicate that the source device 102 is in same orientation for a specific time period. In an example, the orientation of the source device 102 may be detected by an accelerometer or a gyroscope of the source device 102. If the source device 102 remains at the same position for say 30 seconds, the source device 102 may automatically transmit the status same message to the control engine 108.

In response to the status same message, the control engine 108 may transmit a display OFF command to the source device 102. In an example, the display OFF command may include instructions to save user backlight settings and turn OFF the backlight of the screen 106 of the source device 102. The user backlight settings may indicate backlight settings, for example, 100% lit, as defined by a user prior to screen mirroring. Once saved, the user backlight settings may be retrieved at a later point in time.

Accordingly, the examples described herein facilitate in reducing power consumption of the source device 102 by pausing the signal stream between the electronic device 100 and the source device 102 upon ascertaining that the screen displaying the mirrored content is in a suppressed display state for the specific time period. In an example, the suppressed state may indicate a minimized state of the screen displaying the mirrored content. In addition, the backlight of the screen 106 of the source device 102 may be turned OFF, whenever the source device 102 remains in same orientation for the specific time period.

Figure 2:
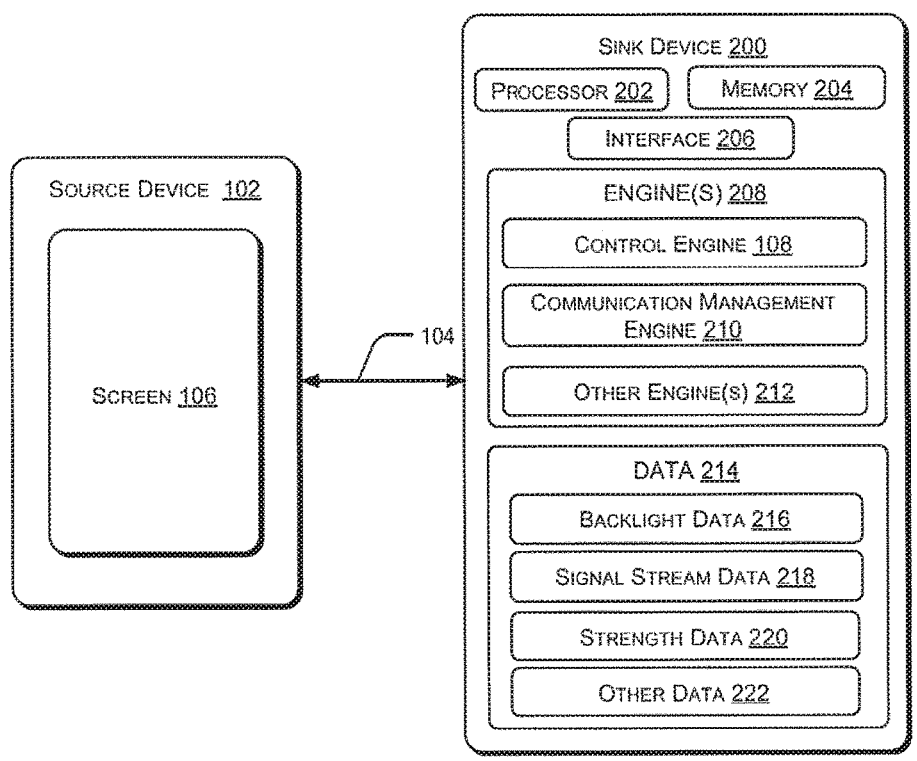
FIG. 2 illustrates a block diagram of a sink device coupled to a source device for screen mirroring, according to an example.

The above aspects and further details are described in conjunction with FIG. 2. FIG. 2 illustrates a block diagram of a sink device 200 coupled to the source device 102 for screen mirroring, according to an example. In an example, the sink device 200 may be similar to the electronic device 100. Further, the sink device 200 and the source device 102 may include laptops, smartphones, tablets, and the like.

In one example, the sink device 200 includes a processor 202 and a memory 204 coupled to the processor 202. The processor 202 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labeled as "processor(s)", may be provided through the use of dedicated hardware as well as hardware capable of executing computer-readable instructions.

The memory 204, communicatively coupled to the processor 202, can include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The sink device 200 also includes interface(s) 206. The interface(s) 206 may include a variety of interfaces, for example, interfaces 206 for users. The interface(s) 206 may include data output devices. The interface(s) 206 facilitate the communication of the sink device 200 with various communication and computing devices and various communication networks, such as networks that use a variety of protocols, for example, Real Time Streaming Protocol (RTSP), Hypertext Transfer Protocol (HTTP) Live Streaming (HLS) and Real-time Transport Protocol (RTP).

Further, the sink device 200 may include engines 208. The engines 208, amongst other things, include routines, programs, objects, components, and data structures, which perform particular tasks or implement particular abstract data types. The engines 208 may also be implemented as, signal processor(s), state machine(s), logic circuitries, and/or any other device or component that manipulates signals based on operational instructions. Further, the engines 208 can be implemented by hardware, by computer-readable instructions executed by a processing unit, or by a combination thereof. In one example, the engines 208 include the control engine 108, a communication management engine 210, and other engine(s) 212. The other engine(s) 212 may include programs or coded instructions that supplement the applications or functions performed by the sink device 200. The engines 208 may be implemented as described in relation to FIGS. 1 and 2.

In an example, the sink device 200 includes data 214. The data 214 may include a backlight data 216, a signal stream data 218, a strength data 220, and other data 222, The other data 222 may include data generated and saved by the engines 208 for implementing various functionalities of the sink device 200.

In an example, the control engine 108 of the sink device 200 may establish the communication link 104 with the source device 102 for mirroring the screen 106 of the source device 102 on the sink device 200. The communication link 104 may be a wireless or wired link. The control engine 108 may establish the communication link 104 based on the communication request received from the source device 102, The control engine 108 may transmit the acknowledgement message to the source device 102 to confirm that the communication link 104 is established for mirroring the screen 106.

In an example, once the communication link 104 is established, the source device 102 may transmit a status same message to the electronic device 102. The status same message may be transmitted by the source device 102 to indicate a stationary position of the source device 102. For example, the status same message may indicate that the source device 102 is in same orientation for a specific time period.

The status same message may be received by the control engine 108. In response to the status same message, the control engine 108 may transmit a display OFF command to the source device 102. The display OFF command may direct the source device 102 to save user backlight settings and turn OFF the backlight of the screen 106 of the source device 102. The user backlight settings may indicate an intensity of the backlight defined by a user prior to screen mirroring. In an example, the control engine 108 may store a current state of the backlight of the screen 106 of the source device 102 as the backlight data 216.

In an example, after the backlight of the screen 106 of the source device 102 is turned OFF, if an event takes place at the source device 102, the source device 102 may send an event notification to the electronic device 100. The event may include an incoming communication or a change in the orientation of the source device 102. Examples of the incoming communication may include, but are not limited to, an audio call, a video call, a text message, an e-mail, or a combination thereof. Further, the change in the orientation of the source device 102 may indicate that the source device 102 is moved from a previous position. For example, if the user of the source device 102 picks the source device 102 to dial a phone number or to attend to a communication, the event notification may be sent to the sink device 200.

The event notification may be received by the control engine 108. In response to the event notification, the control engine 108 may change the display state of the screen displaying mirrored contents, from a normal state to a minimized state. Further, the control engine 108 may send a switch command to the source device 102 to pause the signal stream and turn ON the backlight of the screen 106 of the source device 102. In an example, the control engine 108 may store a current state of the signal stream as the signal stream data 218. Thus, during any screen mirroring session if any communication is received at the source device 102, the streaming may be paused and the backlight of the screen 106 of the source device 102 may be turned ON, if not already.

In an example, after the backlight of the screen 106 of the source device 102 is turned OFF, the control engine 108 may ascertain the display state of the screen displaying the mirrored content on the sink device 200. If the screen displaying the mirrored content is minimized for a specific time period, say 10 seconds or more, the control engine 108 may transmit a pause request to the source device 102 to pause a signal stream from the source device 102.

In an example, the screen may be voluntarily minimized by a user of the sink device 200 or may be automatically minimized. In response to the pause request, the source device 102 may transmit a pause response indicating pausing the signal stream to the sink device 200.

Now, while the backlight of the screen 106 of the source device 102 is turned OFF and the stream signal is paused, if any event occurs at the source device 102, for example, if the source device 102 receives any communication, such as a voice call, or a user of the source device 102 picks up the source device 102, an event notification may be sent to the control engine 108. As described above, the event notification may indicate any incoming communication or change in the orientation of the source device 102. In response to the event notification, the control engine 108 may send a display ON command to the source device 102. The display ON command may indicate turning ON the backlight of the screen 106 of the source device 102 based on the user backlight settings. Therefore, occurrence of any event at the source device 102 may result in turning ON the backlight of the screen 106 of the source device 102, if not already.

In an example, while the backlight of the screen 106 is turned ON and the signal stream is paused, if the display state of the screen displaying the mirrored content on the sink device 200 is changed, i.e., brought to the normal state, the control engine 108 may transmit a resume request to the source device 102. In an example, the display state of the screen displaying the mirrored content may change when the user manually changes the display state. In another example, the display state may change to the normal state, when the user of the source device 102 shakes the source device 102. When gyroscope of the source device 102 detects a shaking motion of the source device, a trigger may be sent to the sink device 200 to wake up the screen displaying the mirrored content.

The resume request is transmitted to request the source device 102 to resume the signal stream. In response to the resume request, the source device 102 may send a resume response to the control engine 108 to indicate that the streaming of the signal has been resumed.

In an example, while the backlight of the screen 106 is turned ON and the signal stream is paused, the communication management engine 210 may determine whether a strength of the communication link 104 is below a specific threshold value, for example, −70 dBm. For example, if the user of the source device 102 takes the source device 102 away from the sink device 200, the strength of the communication link 104 may weaken. If the strength of the communication link 104 between the sink device 200 and the source device 102 weakens below the specific threshold value, the communication management engine 210 may send a lock notification to the source device 102. The lock notification may indicate inaccessibility of the sink device 200. Upon receiving the lock notification, the source device 102 may send an acknowledgement of the inaccessibility of the sink device 200.

When the strength of the communication link 104 goes above the specific threshold value, the communication management engine 210 may send an unlock notification to the source device 102. The unlock notification indicates that the sink device 200 is now accessible for the screen mirroring. Further, the source device 102 may send another acknowledgement to the communication management engine 210 to acknowledge the accessibility of the sink device 200.

In an example, once the communication link 104 is established and the screen mirroring session is resumed, the control engine 108 may determine the display state of the screen displaying the mirrored content on the sink device 200. If the screen displaying the mirrored content is minimized for the specific time period, such as 10 seconds or more, the control engine 108 may transmit the pause request to the source device 102 to pause the signal stream from the source device 102.

As mentioned above, the screen may be voluntarily minimized by a user of the sink device 200 or may be automatically minimized. In response to the pause request, the source device 102 may transmit the pause response indicating pausing the signal stream to the sink device 200.

As the backlight of the screen 106 is ON and the signal stream is paused, the control engine 108 may receive the status same message from the source device 102. As described above, the status same message is sent when the source device 102 is in the same orientation for the specific time period. In response to the status same message, the control engine 108 may transmit a display OFF command to the source device 102. In an example, the display OFF command may include instructions to save user backlight settings and turn OFF the backlight of the screen 106 of the source device 102.

Thus, at any stage of the screen mirroring session, if the source device 102 remains in one orientation for more than the specific time period, the sink device 200 may send the display OFF command to turn OFF the backlight of the screen 106 of the source device 102. Accordingly, consumption of the battery of the source device 102 is reduced.

While the backlight is OFF and the signal stream is paused, if the display state of the screen displaying the mirrored content on the sink device 200 is changed, i.e., brought to the normal state, the control engine 108 may transmit the resume request to the source device 102. The resume request is transmitted when the sink device 200 requests the source device 102 to resume the signal stream. In response to the resume request, the source device 102 may send the resume response to the control engine 108 to indicate that the streaming of the signal has been resumed.

At this point, when the backlight of the screen 106 is OFF while the signal stream is resumed between the devices 102 and 200, if the orientation of the source device 102 changes, a status change message may be transmitted from the source device 102 to the control engine 108. For example, the change in orientation of the source device may occur if the source device 102 is moved from one location to another or the user shakes the source device 102 or the user picks up the source device 102 to dial a number, the source device 102 may send the status change message to the control engine 108.

In response to the status change message, the control engine 108 may transmit a display ON command to the source device 102. The display ON command may indicate turning ON the backlight of the screen 106 of the source device 102 based on the user backlight settings. In an example, the user backlight settings may refer to the intensity of the backlight defined by the user prior to the screen mirroring.

In an example, once the communication link 104 is established and the screen mirroring session is connected, there may be instances when the user of the source device 102 may wish to disconnect the communication link 104. In such cases, the user may turn the source device 102 upside down. As a result, the gyroscope of the source device 102 may detect a turnover movement and a turnover notification may be sent to the sink device 200. In an example, the communication management engine 210 may receive the turnover notification from the source device 102.

In response to the turnover notification, the communication management engine 210 may send a disconnect request to the source device 102 to disconnect the communication link 104 between the source device 102 and the sink device 200. Upon receiving the disconnect request, the source device 102 may transmit a disconnect response to the communication management engine 210. Accordingly, the communication link 104 may stop between the source device 102 and the sink device 200. Further, the communication management engine 210 may store a current state of the communication link 104 as the strength data 220.

In an example, the user may want to re-connect the communication link 104 that is disconnected either by the user or due to other reasons. For example, due to poor signal strength, the communication link 104 may get automatically disconnected between the devices 200 and 102. In such scenarios, the user may initiate re-connection of the communication link 104 by turning over the source device 102. As explained above, the gyroscope of the source device 102 may detect the turnover movement and send the turnover notification to the communication management engine 210. The communication management engine 210 may, based on the current state of the communication link 104, send a connect request to the source device 102. Upon receiving the connect request, the source device 102 may establish the communication link 104 and transmit a connect response to the communication management engine 210.

Accordingly, the examples described herein enable in managing the signal stream and power consumption of the source device to efficiently utilize the battery of the source device. In addition, unintended content is prevented from being displayed on the screen displaying the mirrored content, thereby maintaining privacy of the user. The present subject matter also minimizes human intervention for connecting/disconnecting the communication link.

Various states of the backlight (ON/OFF) of the screen 106 of the source device 102 and the stream signal (pause/resume) have been summarized in Table 1. Table 1 includes initial states of the backlight and the signal stream, triggers that cause change in the initial states, messages sent as a result of the triggers, and the updated states of the backlight and the signal stream.

TABLE 1

| Initial Display Status | Initial Signal Stream Status | Trigger | Message | Updated Display Status | Updated Signal Stream Status |
|---|---|---|---|---|---|
| ON | ON | Source device remains in same orientation for a specific time period | Status same message sent to electronic device | OFF | ON |
| OFF | ON | Incoming communication or change in orientation of the source device | Event notification received by the electronic device | ON | OFF |
| OFF | ON | Screen displaying the mirrored content is in a minimized state for a specific time period | Pause request sent to the source device | | |
| OFF | OFF | Change in orientation of the source device detected | Status change message received by the electronic device | ON | OFF |
| ON | OFF | A display state of the screen displaying the mirrored content is changed to normal | Resume request sent to the source device | ON | ON |
| ON | ON | Screen displaying the mirrored content is in a minimized state for a specific time period | Pause request sent to the source device | ON | OFF |
| ON | OFF | Source device remains in same orientation for a specific time period | Status same message sent to electronic device | OFF | OFF |
| OFF | OFF | A display state of the screen displaying the mirrored content is changed to normal | Resume request sent to the source device | OFF | ON |
| OFF | ON | Change in orientation of the source device detected | Status change message received by the electronic device | ON | ON |

Figure 3A:
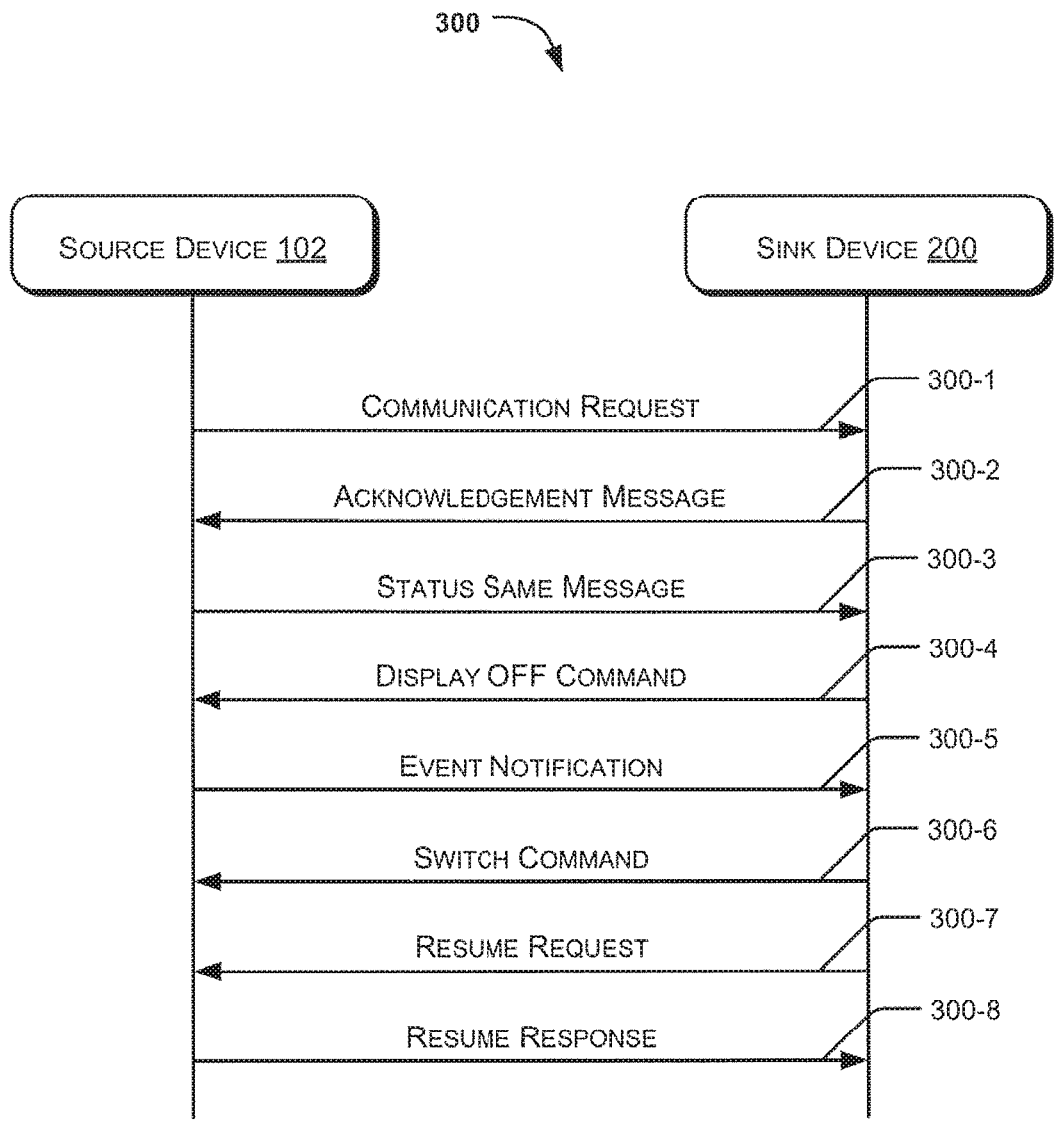
FIG. 3A illustrates a flow diagram for communication between a sink device and a source device, according to an example.
Figure 3B:
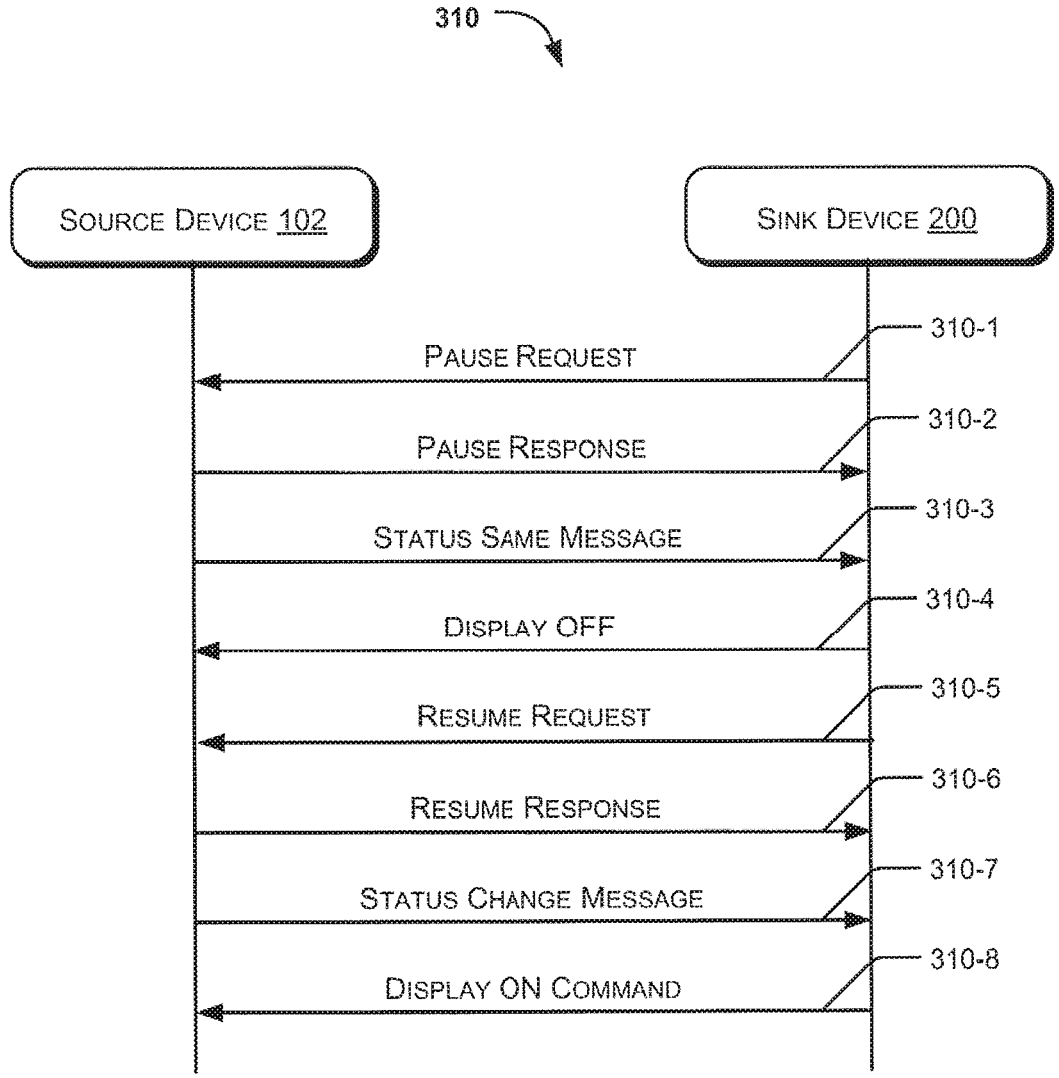
FIG. 3B illustrates a flow diagram for communication between a sink device and a source device, according to an example.
Figure 3C:
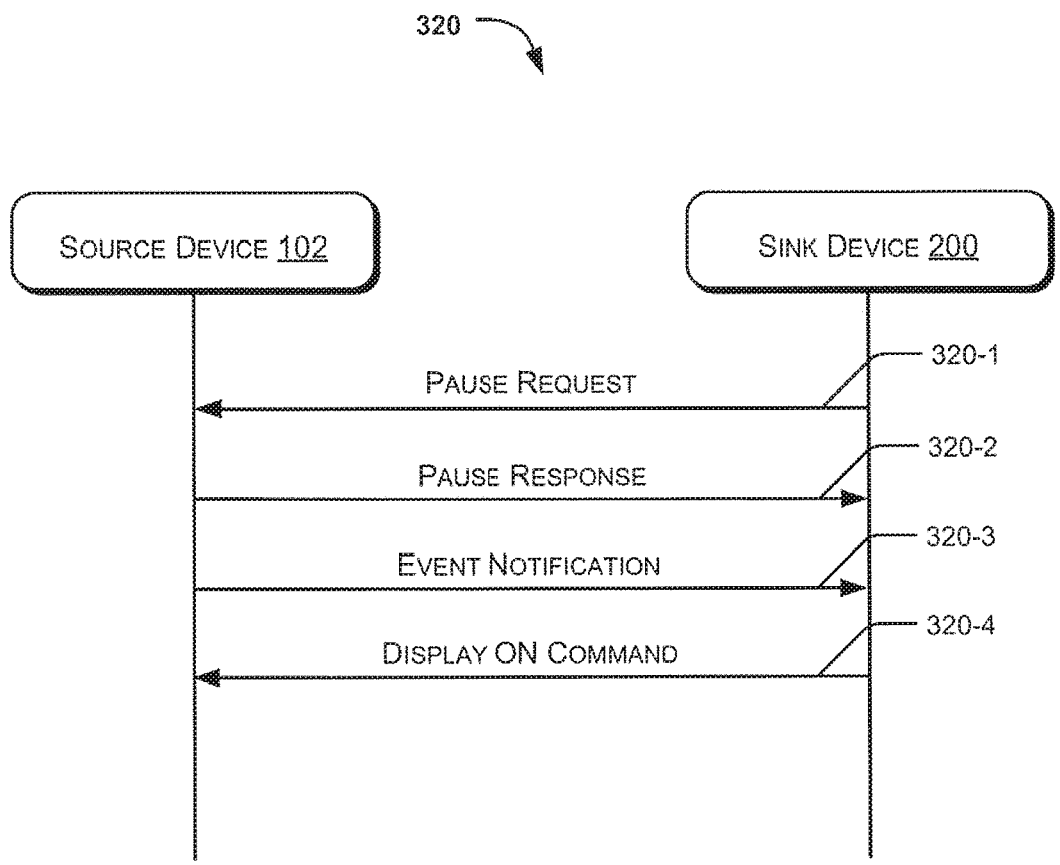
FIG. 3C illustrates a flow diagram for communication between a sink device and a source device, according to an example.

FIGS. 3A, 3B, and 3C illustrate flow diagrams 300, 310, and 320 respectively for communication between the sink device 200 and the source device 102, according to various examples. Various arrow indicators used in the flow diagrams 300, 310, and 320 depict transfer of data or messages/signals/commands between the sink device 200 and the source device 102. In an example, the commands may be exchanged between the sink device 200 and the source device 102 using a Real Time Streaming Protocol (RTSP).

The flow diagrams 300, 310, and 320 show various arrows pertaining to communication between the sink device 200 and the source device 102; however various other communications between the sink device 200 and the source device 102, as explained in conjunction with FIGS. 1 and 2, and/or other entities may also be part of the flow diagrams 300, 310, and 320.

In the flow diagram 300, arrow 300-1 represents a communication request sent from the source device 102 to the sink device 200 for establishing a communication link for mirroring the screen 106. Arrow 300-2 represents an acknowledgement message from the sink device 200 to the source device 102 for confirming that the communication link is established. Arrow 300-3 represents a status same message sent by the source device 102 to the sink device 200 to indicate same orientation of the source device 102 for a specific time period, such as 30 seconds. Arrow 300-4 represents a display OFF command sent from the sink device 200 to the source device 102, in response to the status same message, to turn OFF a backlight of the screen of the source device 102. In an example, the display OFF command also indicates saving user backlight settings before turning OFF the backlight of the screen of the source device 102. The user backlight settings may indicate backlight settings, for example, 100% lit, as defined by a user prior to screen mirroring.

Further, arrow 300-5 represents an event notification sent from the source device 102 to the sink device 200 to indicate occurrence of an event at the source device 102. The event may include an incoming communication or a change in the orientation of the source device 102. In an example, the incoming communication may include an audio call, a video call, a text message, an e-mail, or a combination thereof. Further, the change in orientation of the source device 102 may be detected by an accelerometer sensor or a gyroscope sensor that may be embedded in the source device 102. Upon receiving the event notification, the sink device 200 may change a display state of the screen mirrored on the sink device 200 from a normal state to a suppressed state. Arrow 300-6 represents a switch command sent by the sink device 200 to the source device 102, in response to the event notification. The switch command may be indicative of pausing the signal stream and turning ON the backlight of the screen of the source device 102. In an example, the switch command may also indicate setting the backlight of the screen of the source device 102 based on the user backlight settings.

In addition, arrow 300-7 represents a resume request sent by the sink device 200 to the source device 102, to resume the signal stream, when a display state of a screen displaying mirrored content is changed from the suppressed state to a normal state. Further, arrow 300-8 represents a resume response sent from the source device 102 to the sink device 200 in response to the resume request. The resume response may indicate resuming the signal stream.

Referring to FIG. 3B, the flow diagram 310 depicts a scenario where instead of receiving the status same message as shown by arrow 300-3, a pause request is sent by the electronic device 100. In an example, the arrow 310-1 represents the pause request sent by the sink device 200 to the source device 102, to pause the signal stream. In an example, the pause request is sent when the screen of the source device 102 is in a minimized display state for a specific time period. Arrow 310-2 represent a pause response sent by the source device 102 to the sink device 200 in response to the pause request. The pause response is indicative of pausing the stream signal.

Further, arrow 310-3 represents the status same message sent by the source device 102 to the sink device 200, to indicate same orientation of the source device 102 for a specific time period. In an example, the orientation of the source device 102 may be determined by a sensor, for example, an accelerometer or a gyroscope, of the source device 102. Arrow 310-4 represents a display OFF command sent by the sink device 200 to the source device 102, in response to the status same message. The display OFF command may include instructions to save the user backlight settings and turn OFF the backlight of the screen of the source device 102.

In addition, arrow 310-5 represents a resume request sent from the sink device 200 to the source device 102 upon change in the display state of the screen displaying the mirrored content from the minimized state to a normal state, to resume the signal stream. Arrow 310-6 represents a resume response sent from the source device 102 to the sink device 200 in response to the resume request. The resume response may indicate resuming of the signal stream. Arrow 310-7 represents a status change message sent from the source device 102 to the sink device 200, when the backlight of the screen of the source device 102 is turned OFF and the stream signal is resumed. The status change message is sent when there is a change in the orientation of the source device 102. In an example, the change in orientation of the source device 102 may be detected by an accelerometer sensor or a gyroscope sensor that may be embedded in the source device 102. Arrow 310-8 represents a display ON command sent by the sink device 200 to the source device 102 in response to the status change message, to turn ON backlight of the screen of the source device based on the user backlight settings.

Referring to FIG. 3C, the flow diagram 320 depicts a scenario where instead of occurrence of the event as shown by arrow 300-5, the pause request is sent by the sink device 200. In an example, arrow 320-1 represents the pause request sent by the sink device 200 to the source device 102. The pause request is sent when the display state of the screen displaying the mirrored content is the suppressed display state, for a specific time period. The pause request is sent to pause the signal stream. Arrow 320-2 represents the pause response sent by the source device 102 to the sink device 200, in response to the pause request. The pause response is indicative of pausing the signal stream.

Further, arrow 320-3 represents the event notification sent from the source device 102 to the sink device 200 to indicate occurrence of the event at the source device 102. As explained, the event may include the incoming communication or a change in the orientation of the source device 102. Arrow 320-4 represents the display ON command sent by the sink device 200 to the source device 102 in response to the event notification, to turn ON the backlight of the screen of the source device 102. In an example, the display ON command may also indicate setting the backlight of the screen of the source device 102 based on the user backlight settings.

FIGS. 4, 5, 6, and 7 illustrate methods 400, 500, 600, and 700 of mirroring a screen, according to various examples. The methods 400, 500, 600, and 700 describe communication between a sink device and the source device 102 for mirroring a screen. The sink device is similar to the electronic device 100 on to which a screen of the source device 102 is mirrored. A device whose screen is casted is referred to as the source device and a device on to which the screen is mirrored is referred to as the sink device. The sink device is similar to the electronic device 102.

The methods 400, 500, 600, and 700 can be implemented by processor(s) or device(s) through any suitable hardware, a non-transitory machine readable medium, or a combination thereof. Further, although the methods 400, 500, 600, and 700 are described in context of the sink device and the source device that are similar to the aforementioned devices 100 and 102, other suitable devices or systems may be used for execution of the methods 400, 500, 600, and 700.

In some example, processes involved in the methods 400, 500, 600, and 700 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Figure 4:
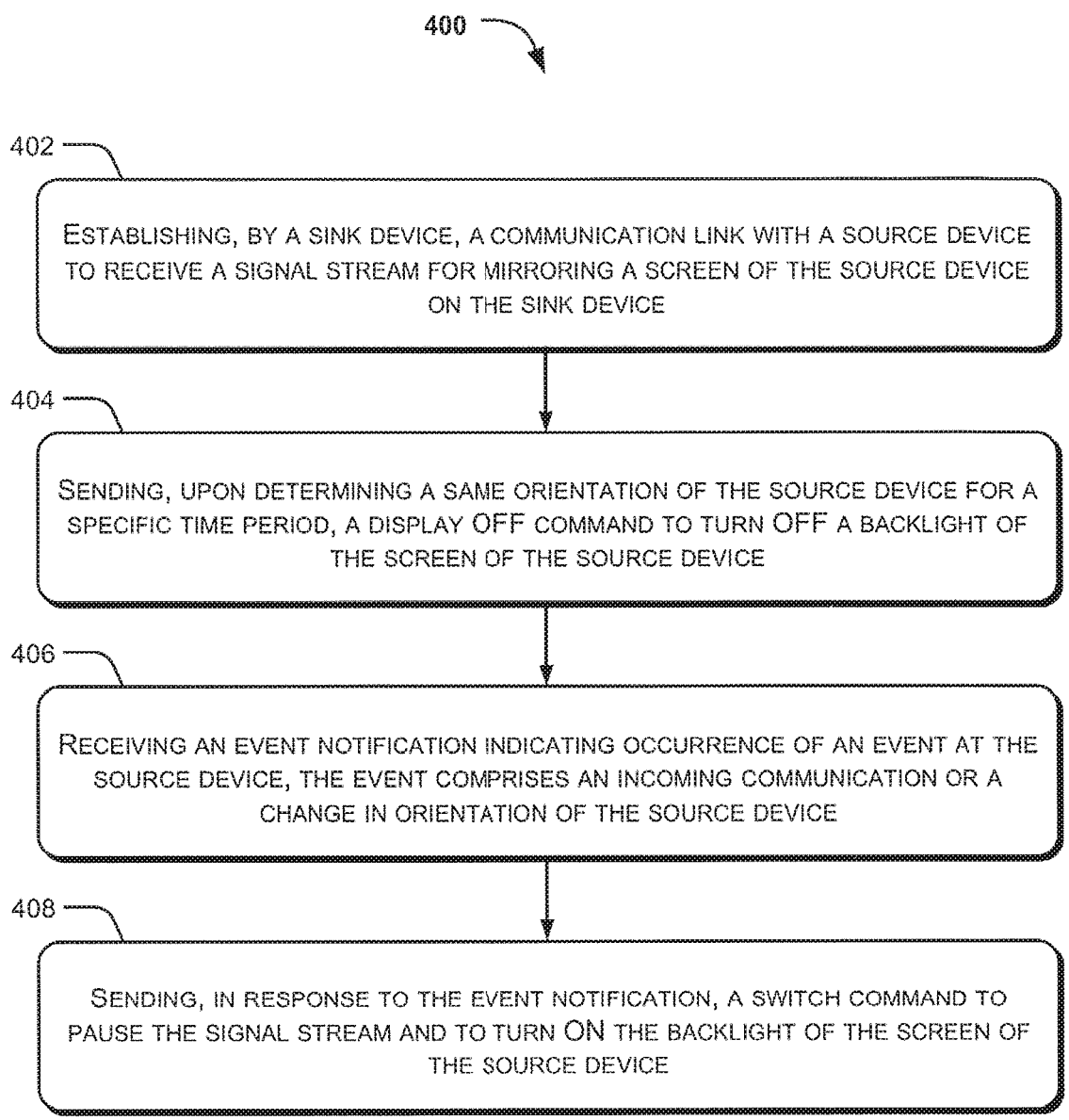
FIG. 4 illustrates a method of mirroring a screen, according to an example.

Referring to FIG. 4, at block 402, a communication link, such as the communication link 104, may be established by the sink device 100 with the source device 102 to receive a signal stream for mirroring the screen 106 of the source device 102 on the sink device 100. The communication link 104 may be a wired or wireless link established based on a communication request received from the source device 102. In an example, the control engine 108 may establish the communication link 104 with the source device 102.

At block 404, upon establishing the communication link 104, a display OFF command may be sent to the source device 102 to turn OFF a backlight of the screen 106 of the source device 102. In an example, the display OFF command may be sent upon determining that the source device 102 is in a same orientation for a specific time period, for example 30 seconds. The display OFF command may be received by the source device 102, and accordingly the backlight of the screen 106 of the source device 102 is turned OFF. In an example, the control engine 108 may send the display OFF command to the source device 102.

At block 406, an event notification may be received by the sink device 100 from the source device 102. The event notification may be indicative of occurrence of an event on the source device 102. Further, the event may include an incoming communication or a change in an orientation of the source device 102. In an example, the control engine 108 may receive the event notification from the source device 102. In an example, the incoming communication may include an audio call, a video call, a text message, an e-mail, or a combination thereof.

At block 408, in response to the event notification, a switch command may be sent to the source device 102. The switch command may include instructions to pause the signal stream and to turn ON the backlight of the screen 106 of the source device 102. In an example, the control engine 108 may send the switch command to the source device 102. Further, before sending the switch command, a display state of the screen displaying the mirrored content on the sink device 100 may be changed from a normal state to a suppressed state.

In an example, after pausing the signal stream and turning ON the backlight of the screen 106 of the source device 102, a status same message may be received by the sink device 100. The status same message may indicate the same orientation of the source device 102 for the specific time period. In response to the status same message, a display OFF command may be sent by the sink device 100 to the source device 102. The display OFF command may indicate saving user backlight settings and turning OFF the backlight of the screen 106 of the source device 102. In an example, the control engine 108 may receive the status same message and send the display OFF command.

Figure 5:
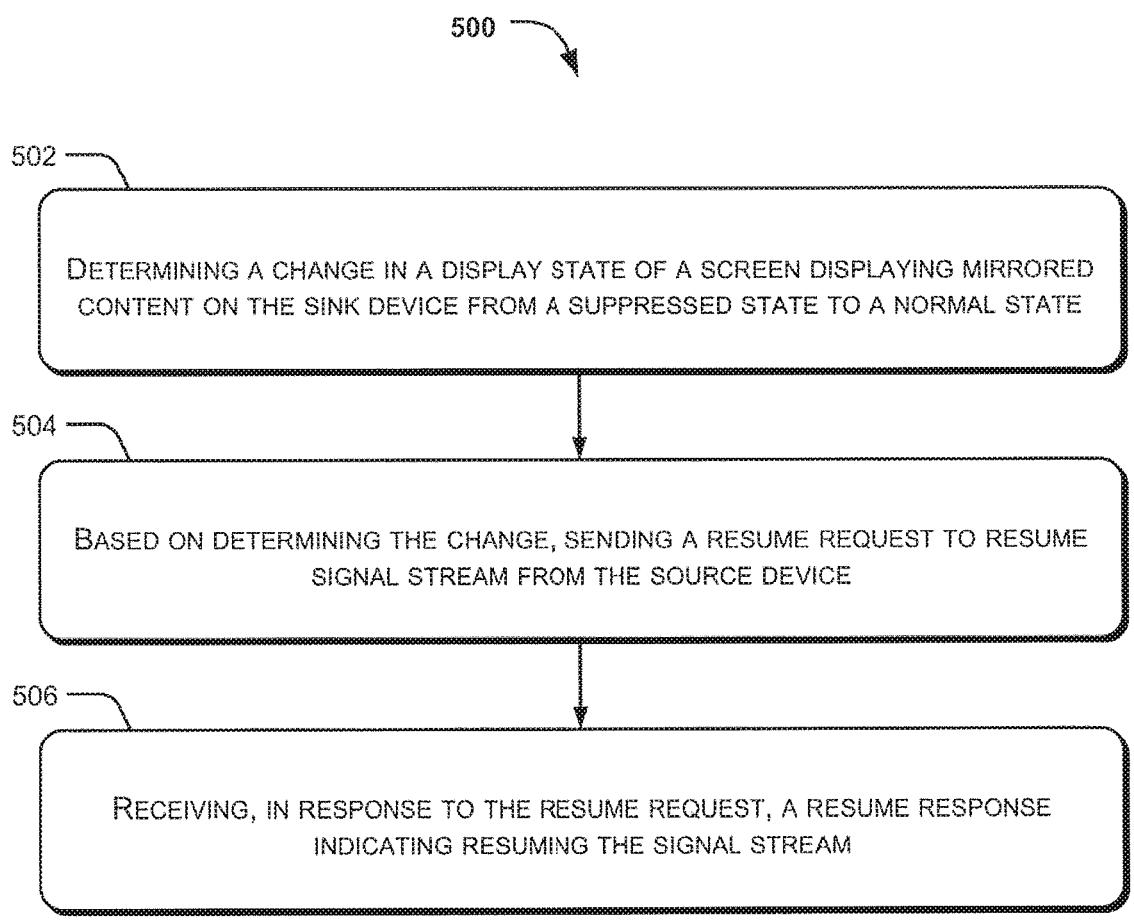
FIG. 5 illustrates a method of mirroring a screen, according to an example.

Referring to FIG. 5, at block 502, the sink device 100 may determine a change in the display state of the screen mirrored on the sink device 100. The display state may change from a suppressed state to a normal state. In an example, the suppressed display state may be a state in which the screen displaying the mirrored content on the sink device 100 is minimized. In an example, the control engine 108 may determine the change in the display state of the screen displaying the mirrored content.

At block 504, based on determining the change in the display state, a resume request may be sent to the source device 102. The resume request may be sent to resume the signal stream from the source device 102. In an example, the control engine 108 may send the resume request.

Further, at block 506, in response to the resume request, a resume response is received from the source device 102. The resume request may indicate resuming the signal stream. In an implementation, the control engine 108 may receive the resume response.

Reference is now made to FIG. 6, at block 602, the sink device 100 may receive a turnover notification from the source device 102. The turnover notification may be indicative of a turnover movement of the source device 102. In an example, the turnover movement indicates a flipping of the source device 102. In an example, the communication management engine 210 may receive the turnover notification from the source device 102.

At block 604, in response to the turnover notification, the sink device 100 may send a disconnect request to the source device 102. The disconnect request may be sent to disconnect the communication link 104 between the source device 102 and the sink device 100. In an implementation, the communication management engine 210 may send the disconnect request to the source device 102.

At block 606, the sink device 100 may receive a disconnect response from the source device 102. The disconnect response may be indicative of disconnection of the communication link 104. In an example, the communication management engine 210 may receive the disconnect response.

Referring to FIG. 7, at block 702, the sink device 100 may determine whether a strength of the communication link 104 is below a specific threshold value, for example −70 dBm. In an example, the communication management engine 210 may determine the strength of the communication link 104.

At block 704, based on determining the strength, the sink device 100 may send a lock notification to the source device 102. The lock notification may indicate inaccessibility of the sink device 100. In an example, the communication management engine 210 may send the lock notification.

At block 706, in response to the lock notification, the sink device 100 may receive an acknowledgement of the inaccessibility of the sink device 100, from the source device 102. In an example, the communication management engine 210 may receive the acknowledgement.

In an example, when the strength of the communication link 104 is above the specific threshold value, the sink device 100 may send an unlock notification to the source device 102. The unlock notification may indicate accessibility of the sink device 100. In response to the unlock notification, the sink device 100 may receive an acknowledgement of the accessibility of the sink device 100, from the source device 102. In an example, the communication management engine 210 may send the unlock notification and receive the acknowledgement from the source device 102.

FIG. 8 illustrates a system environment 800 implementing a non-transitory computer readable medium for mirroring a screen, according to an example. The system environment 800 includes a processor 802 communicatively coupled to the non-transitory computer-readable medium 804 through a communication link 806. In an example, the processor 802 may be a processing resource of a source device for fetching and executing computer-readable instructions from the non-transitory computer-readable medium 804. The source device may be the source device 102 as described with reference to FIG. 1.

The non-transitory computer-readable medium 804 can be, for example, an internal memory device or an external memory device. In an example, the communication link 806 may be a direct communication link, such as any memory read/write interface. In another example, the communication link 806 may be an indirect communication link, such as network interface. In such a case, the processor 802 can access the non-transitory computer-readable medium 804 through a communication network (not shown).

In an example, the non-transitory computer-readable medium 804 includes a set of computer-readable instructions for mirroring the screen 106 of the source device 102 on to the electronic device 100. The set of computer-readable instructions may include instructions as explained in conjunction with FIGS. 1 and 2. The set of computer-readable instructions can be accessed by the processor 802 through the communication link 806 and subsequently executed to perform acts for mirroring the screen 106.

Referring to FIG. 8, in an example, the non-transitory computer-readable medium 804 may include instructions 808 to transmit a status same message to a sink device upon establishment of a communication link with the sink device. The communication link is established to mirror a screen of the source device on the sink device. The status same message indicates a same orientation of the source device for a specific time period, for example, 30 seconds. The non-transitory computer-readable medium 804 may include instructions 810 to receive a display OFF command from the sink device in response to the status same message. The status same message may indicate turning OFF a backlight of the screen of the source device.

Further, the non-transitory computer-readable medium 804 may include instructions 812 to receive a pause request from the sink device upon determining a suppressed display state of a screen displaying mirrored content on the sink device for a specific time period. The pause request is indicative of pausing a signal stream. The non-transitory computer-readable medium 804 may include instructions 814 to send an event notification to the sink device. The event notification may indicate occurrence of an event at the source device. In an example, the event may include an incoming communication or change in orientation of the source device. In addition, the non-transitory computer-readable medium 804 may include instructions 816 to receive a display ON command from the sink device in response to the event notification. The display ON command may indicate to turn ON the backlight of the screen of the source device and set the backlight of the screen of the source device based on user backlight settings.

Further, in an example, the non-transitory computer-readable medium 804 may include instructions to receive a resume request from the sink device. The resume request may indicate resuming the signal stream when a display state of the screen of the source device is changed from the suppressed state to a normal state. The non-transitory computer-readable medium 804 may include instructions to send a resume response to the sink device in response to the resume request. The resume response may indicate resuming the signal stream.

Further, in an example, the non-transitory computer-readable medium 804 may include instructions to transmit a turnover notification to the sink device. The turnover notification may indicate a flip movement of the source device. The non-transitory computer-readable medium 804 may include instructions to receive a disconnect request from the sink device in response to the turnover notification. The disconnect request may indicate disconnection of the communication link. The non-transitory computer-readable medium 804 may include instructions to send to the sink device in response to the disconnect request, a disconnect response indicating disconnection of the communication link.

Although examples for the present disclosure have been described in language specific to structural features and/or methods, it is to be understood that the appended claims are not limited to the specific features or methods described herein. Rather, the specific features and methods are disclosed and explained as examples of the present disclosure.

We claim:

1. A method comprising:
   establishing, by a sink device, a communication link with a source device to receive a signal stream to mirror a screen of the source device on the sink device;
   sending, upon determining a same orientation of the source device for a specific time period, a display OFF command to turn OFF a backlight of the screen of the source device;
   receiving, at the sink device, an event notification indicating occurrence of an event at the source device, wherein the event comprises an incoming communication or a change in the orientation of the source device; and
   sending, by the sink device, in response to the event notification, a switch command to pause the signal stream and to turn ON the backlight of the screen of the source device, wherein sending the switch command comprises changing a display state of a screen displaying mirrored content on the sink device from a normal state to a suppressed state.

2. The method as claimed in claim 1, further comprising:
   receiving, at the sink device, after pausing the signal stream and turning ON the backlight of the screen of the source device, a status same message indicating the same orientation of the source device for the specific time period; and
   sending, in response to the status same message, a display OFF command to save user backlight settings and turn OFF the backlight of the screen of the source device.

3. The method as claimed in claim 1, further comprising:
   sending, upon change in a display state of a screen displaying mirrored content on the sink device from a suppressed state to a normal state, a resume request to resume the signal stream from the source device; and
   receiving, in response to the resume request, a resume response indicating resuming of the signal stream.

4. The method as claimed in claim 1, further comprising:
   receiving a turnover notification to indicate a turnover movement of the source device;
   sending, by the sink device, in response to the turnover notification, a disconnect request to disconnect the communication link between the source device and the sink device; and
   receiving, in response to the disconnect request from the source device, a disconnect response indicating disconnection of the communication link.

5. The method as claimed in claim 1, further comprising:
   determining whether a strength of the communication link is below a specific threshold value;
   based on determining the strength, sending, by the sink device, a lock notification indicating inaccessibility of the sink device; and
   receiving, at the sink device, in response to the lock notification, an acknowledgement of the inaccessibility of the sink device.

6. The method as claimed in claim 5, further comprising:
sending, by the sink device, an unlock notification indicating accessibility of the sink device, when the strength of the communication link is above the specific threshold value; and
receiving, at the sink device, in response to the unlock notification, an acknowledgement of the accessibility of the sink device.

7. An electronic device comprising:
a control engine to:
establish a communication link with a source device to receive a signal stream to mirror a screen of the source device; and
transmit a pause request to the source device when a screen displaying mirrored content is minimized for a specific time period, the pause request is to pause the signal stream;
receive a status same message from the source device indicating same orientation of the source device for a specific time period; and
transmit, in response to the status same message, a display OFF command to save user backlight settings and turn OFF a backlight of the screen of the source device.

8. The electronic device as claimed in claim 7, wherein the control engine is to:
transmit, after pausing the signal stream and turning OFF the backlight of the screen of the source device, a resume request to the source device, upon change in a display state of the screen displaying the mirrored content from the minimized state to a normal state, the resume request is to resume the signal stream; and
receive a resume response, from the source device in response to the resume request, indicating resumption of the signal stream.

9. The electronic device as claimed in claim 8, wherein the control engine is to:
receive a status change message indicating a change in the orientation of the source device; and
transmit, in response to the status change message, a display ON command to turn ON the backlight of the screen of the source device based on the user backlight settings and set the backlight of the screen of the source device based on the user backlight settings.

10. The electronic device as claimed in claim 7, wherein the control engine is to:
receive an event notification indicating occurrence of an event at the source device, wherein the event comprises an incoming communication or a change in the orientation of the source device; and
transmit, in response to the event notification, a display ON command to turn ON the backlight of the screen of the source device and set the backlight of the screen of the source device based on the user backlight settings.

11. The electronic device as claimed in claim 10, wherein the incoming communication is an audio call, a video call, a text message, an e-mail, or a combination thereof.

12. A non-transitory computer-readable medium comprising computer-readable instructions, which, when executed by a processor of a source device, cause the processor to:
transmit, to a sink device upon establishment of a communication link with the sink device to mirror a screen on the sink device, a status same message indicating a same orientation of the source device for a specific time period;
receive a display OFF command, in response to the status same message, to turn OFF a backlight of a screen of the source device;
receive a pause request, upon determining a suppressed display state of a screen displaying mirrored content on the sink device for a specific time period, the pause request is indicative of pausing a signal stream;
send an event notification indicating occurrence of an event at the source device, wherein the event comprises an incoming communication or a change in the orientation of the source device; and
receive a display ON command, in response to the event notification, to turn ON the backlight of the screen of the source device and set the backlight of the screen of the source device based on a user backlight setting.

13. The non-transitory computer-readable medium as claimed in claim 12, wherein the instructions which, when executed by the processor, cause the processor to:
receive a resume request to resume the signal stream when a display state of the screen displaying the mirrored content on the sink device is changed from the suppressed state to a normal state; and
send a resume response, in response to the resume request, indicating resuming of the signal stream.

14. The non-transitory computer-readable medium as claimed in claim 12, wherein the instructions which, when executed by the processor, cause the processor to:
transmit a turnover notification to the sink device, the turnover notification indicates a flip movement of the source device;
receive a disconnect request, in response to the turnover notification, to disconnect the communication link; and
send, in response to the disconnect request, a disconnect response indicating disconnection of the communication link.

* * * * *